J. T. AUSTIN.
KEY MECHANISM FOR ORGANS.
APPLICATION FILED DEC. 19, 1913.
1,113,861.
Patented Oct. 13, 1914.
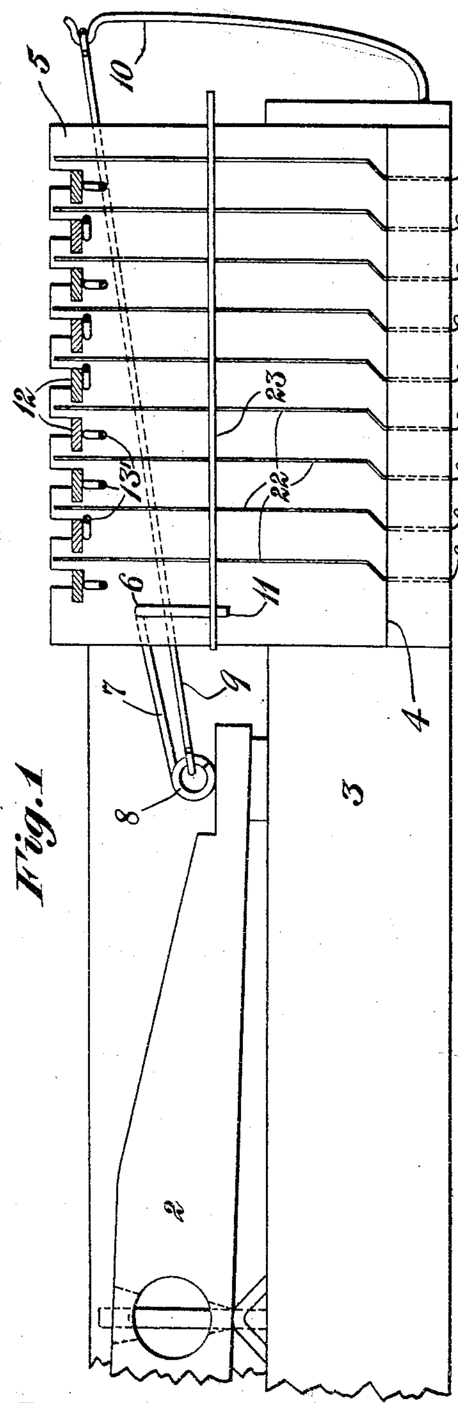
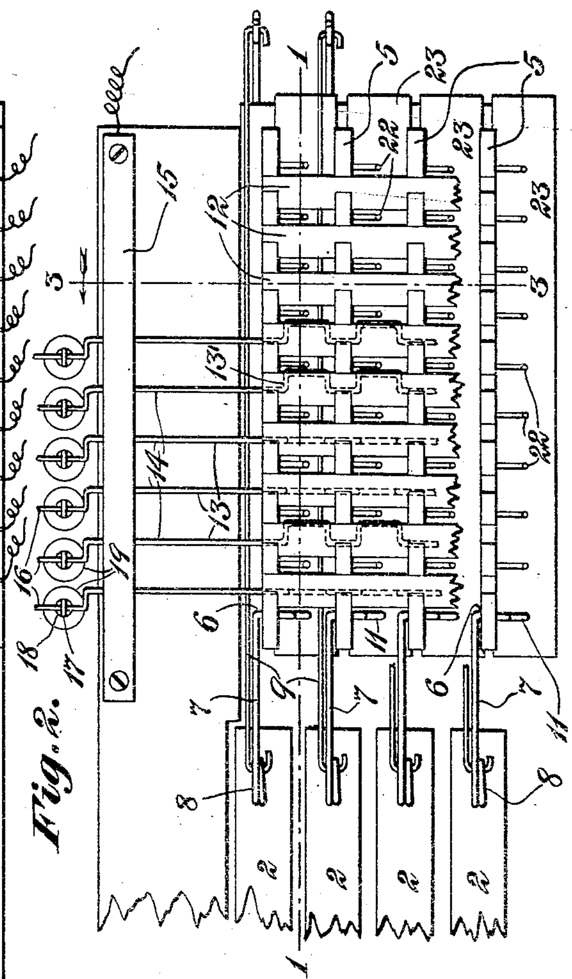
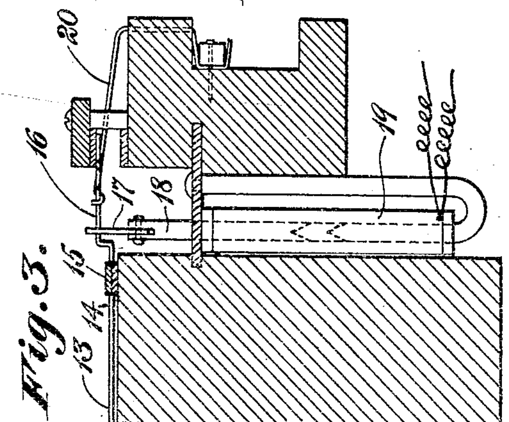
Witnesses:
L. L. Markel
C. B. Anderson
Inventor:
John T. Austin
By his Attorneys,
Sutherland & Anderson

UNITED STATES PATENT OFFICE.

JOHN T. AUSTIN, OF HARTFORD, CONNECTICUT, ASSIGNOR TO AUSTIN ORGAN COMPANY, OF HARTFORD, CONNECTICUT, A CORPORATION OF MAINE.

KEY MECHANISM FOR ORGANS.

1,113,861. Specification of Letters Patent. Patented Oct. 13, 1914.

Application filed December 19, 1913. Serial No. 807,631.

*To all whom it may concern:*

Be it known that I, JOHN T. AUSTIN, a citizen of the United States, residing at Hartford, in the county of Hartford and State of Connecticut, have invented certain new and useful Improvements in Key Mechanism for Organs, of which the following is a specification.

This invention relates to key-mechanism for organs, one of the primary objects of the invention being the simplification and cheapening of the electric-circuit connections comprising the organ-chest-action or other magnets.

In the drawings accompanying and forming part of the present specification I have shown in detail one of the several convenient forms of embodiment of the invention which to enable those skilled in the art to practise the same will be set forth fully in the following description. I do not restrict myself to this disclosure; I may depart therefrom in several respects within the scope of the invention defined by the claims following said description.

Referring to said drawings: Figure 1 is a side elevation partly in section on the line 1—1 of Fig. 2, of key-mechanism involving my invention. Fig. 2 is a top plan view of the same. Fig. 3 is a cross section on the line 3—3 of Fig. 2, looking in the direction of the arrow.

Like characters refer to like parts throughout the several figures of the drawings.

There are several keys 2 shown, and as they may be and are of the ordinary kind and mounting, require no detailed description. The rear portion of the key bed 3 is cut away as at 4 and rising from the bottom of the cut away portion 4, are the vertical, parallel walls 5 having perforations at their forward sides to freely receive the pivots 6 of the swinging arms 7 furnished at their free ends with eyes 8 bearing directly against the inner ends of the respective keys 2. Hooked into the eyes are the forward ends of links 9 connected at their rear ends with bowed springs 10 which apply pulls to the respective links away from their points of connection with the eyes 9. Each arm 7 and link 9 presents a toggle. The pivot portion 6 of each arm 7 has a depending extension or projection 11 which provides a simple way of transferring the effect of said arm when acted on by an organ key, to mechanism by which a pipe (not shown) will be caused to speak, all as shown, described and claimed in my contemporaneously pending application Serial No. 731,269, filed November 14, 1912.

Mortised in the vertical walls or partitions 5 are cross pieces or strips 12 which in addition to strengthening the partition structure also act advantageously as barriers or guards as will hereinafter appear.

In the present case I provide electrically-operated means for operating the organ-pipe valves for instance the customary organ-chest-action magnets or their equivalents may be utilized for this purpose. Each magnet is in a local circuit governed by two separate instrumentalities, one of which may be an organ key, and the other of which may be a stop-operating member, such for example as a stop-key. The organ-key is adapted to effect, through proper means, the movement of one controlling member into operative position where it can be engaged by another controlling member to close an electric circuit and therefore energize a valve operating magnet. It is not new with me to effect the closing of a magnet-circuit to secure the action in question jointly by a stop-key and an organ-key, the invention residing in that member of the circuit which is operable by one of the keys, in the present case the stop-key.

Supported by the partitions 5 are several rock-shafts 13 of conducting material and which have eccentric portions, best obtained by forming in said shafts at desired intervals in their lengths, crank portions 13′, these eccentric or crank portions constituting the active parts of the shafts. When the shafts 13 are in inoperative positions the crank portions thereof will be out of the range of action of circuit-controlling members governed by the respective keys whereas when they are in operative positions the contrary will be the case. Said shafts as shown are made from wire and are bent to form the crank portions therein. As will be understood said shafts 13 are moved from their operative to their inoperative positions by suitable means governed by stop-keys. The shafts 13 have extended portions 14 which project through and turn in openings in the conducting strip 15 to which as will be understood the several shafts 13 are electrically connected. Said shafts terminate in cranks 16 connected as by links 17 with the armatures 18 of the solenoids 19, each solenoid or its equivalent being in a local circuit governed by a stop-key. It is not new with me as already noted to provide these solenoids 19 in local circuits closed by stop-keys and adapted to operate rocking members in such manner that the latter may be put into position to be engaged by circuit closing elements, for which reason I have not deemed it necessary to illustrate any of the circuit connections of said solenoids 19. Acting against the crank portions 16 are springs 20 which normally hold the rock-shafts 13 in their inoperative relations at which time the intermediate cranks 13′ of said rock shafts stand vertically.

It will be understood that the solenoids 19 correspond in number with the stop-keys or equivalents, there being one solenoid for each stop-key or like element. On the energization of any one of the solenoids 19 the armature 18 thereof is attracted to rock through the link 17, the appropriate rock shaft 13 and swing the cranks 13′ upwardly into horizontal position where said cranks can be engaged by circuit closing elements operative by and with the keys 2. In Fig. 1 certain of the crank portions are shown as occupying their inoperative or vertical positions, while others are shown as occupying their operative or horizontal positions.

Circuit-closers such as meet the desired conditions, are those denoted by 22 being represented as consisting of comparatively small wires extending freely through perforations in slides 23. Each wire 22 is in a local circuit which includes a valve-operating magnet or equivalent part. The respective slides 23 are perforated to receive the downturned projections 11 of the arms 7. It will be assumed that several of the shafts 13 are in their operative positions as shown in Fig. 1 and that a key 2 is depressed. On such action the arm 7 operative with said key is swung upward thereby moving the corresponding arm 11 forward and similarly moving the slide 23 to move the free portions of all the wires connected with the moving slide in a like direction. The wires 22 when they engage the crank portions 13′ which are up, close the circuits involving such crank portions, the other circuits remaining open. Each of the spring-wires 22 is in a local circuit which includes a pipe-valve-operating magnet, the strip 15 to which I have already referred being connected with the battery to which the several magnets are connected. It, therefore, follows that if a key be depressed in the illustration given four circuits will be closed to result in the energization of four magnets and the opening of four valves corresponding therewith. However, as already observed there is nothing new with me in this particular feature. It is not new with me to provide even the wires 22, the invention residing in the present case solely in the shafts 13. There have been provided heretofore other devices for accomplishing the offices of these shafts, but these other devices have been complicated, difficult to install and unsatisfactory in operation. The shafts 13 are very light as a result of which the wires 22 can be made correspondingly light; they can be easily and quickly operated, can be readily and inexpensively made, are certain and positive in action and can be made in a single piece. The latter though is not essential but is of advantage.

It will be remembered that the strips 12 have been described as barriers or guards. They prevent positively the spring members 22 coming in contact with the crank portions 13′ of those shafts 13 which are in their inoperative positions. As shown the crank shafts are located below the strips and about substantially midway of the width thereof, so that it follows that when the spring members or wires 22 are advanced in the manner already described, the spring members cannot engage shafts which are in their inoperative positions but will engage the rear edges of the strips 12. The crank portions of those shafts, however, which are in their operative positions will extend rearwardly beyond the rear edges of the strips above the same as shown in Fig. 1, so that these particular crank portions can be readily engaged by coöperating springs or wires on the depression of an organ key or keys. While the strips 12 serve conveniently as barriers ones of an entirely different kind might be provided. As a matter of fact there may be cases where the barriers or guards could be wholly omitted.

What I claim is:

1. In a device of the class described, the combination of a rock-shaft constituting an electrical conductor, having an eccentric portion, a circuit controller, said rock shaft being oscillatory to move said eccentric portion into and out of operative positions, and means for operating said circuit-controller to carry the same against said eccentric portion when the latter is in operative position.

2. In a device of the class described, the combination of a rock shaft constituting an electric conductor, having an eccentric portion, a circuit controller, said rock shaft being oscillatory to move said eccentric portion into and out of operative positions, means for operating said circuit controller to carry the same against said eccentric portion when the latter is in operative position, and means for positively preventing said circuit controller engaging said eccentric portion, when the latter is in inoperative position.

3. In a device of the class described, the combination of a plurality of rock shafts of conducting material, having crank portions, each rock shaft being oscillatory to bring the respective crank portions into operative and inoperative positions, circuit closers, organ keys, and means actuated by said keys for causing the circuit closers to engage said eccentric portions when the latter are in their operative positions.

4. In a device of the class described, the combination of a plurality of strips, rock shafts supported approximately centrally below the respective strips and having crank portions, each shaft being oscillatory to cause the movement of its respective crank portions into vertical and horizontal positions, the respective crank portions when in horizontal positions extending back of the rear edges of the respective strips, keys spring circuit closers, means actuated by said keys for advancing said circuit closers in sets against crank portions when the same are in horizontal positions, the strips being adapted to prevent circuit closers from engaging those crank portions which are vertical.

5. In a device of the class described the combination of a rock shaft of wire, constituting an electric conductor, having bent therein at different points in its length a plurality of crank portions, circuit controllers, said rock shaft being oscillatory to move said crank portions into and out of operative positions, and means for operating said circuit controllers to carry the same against said crank portions when the latter are in their operative positions.

In testimony whereof I affix my signature in presence of two witnesses.

JOHN T. AUSTIN.

Witnesses:
HEATH SUTHERLAND,
CHAS. T. CORLISS.